United States Patent
Bunker

(10) Patent No.: US 6,705,434 B1
(45) Date of Patent: *Mar. 16, 2004

(54) MULTIPLE DISC BRAKE SYSTEM

(75) Inventor: Kenneth James Bunker, Leicester (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/762,905

(22) PCT Filed: Jul. 26, 1999

(86) PCT No.: PCT/GB99/02415

§ 371 (c)(1),
(2), (4) Date: Feb. 14, 2001

(87) PCT Pub. No.: WO00/09903

PCT Pub. Date: Feb. 24, 2000

(30) Foreign Application Priority Data

Aug. 15, 1998 (GB) ............................................. 9817759

(51) Int. Cl.[7] ........................... F16D 65/12; F16D 65/52
(52) U.S. Cl. ................. 188/18 A; 188/71.5; 188/73.38; 188/218 XL; 192/70.2
(58) Field of Search ............................... 188/71.1, 71.5, 188/18 A, 73.35, 218 XL, 73.2, 73.1, 218 A, 71.7, 206 ALL, 205 ALL, 250 E, 73.38, 73.43, 73.37; 192/70.2, 70.19, 70.16–70.23, 30 V; 464/75; 403/359, 365, 357, 220; 301/6.2, 6.91, 6.1

(56) References Cited

U.S. PATENT DOCUMENTS

| | | | | |
|---|---|---|---|---|
| 2,724,252 A | * | 11/1955 | Schmal | |
| 2,737,033 A | * | 3/1956 | Bendall | |
| 2,764,261 A | * | 9/1956 | Bridges | |
| 3,146,860 A | | 9/1964 | Wilson | |
| 3,191,735 A | * | 6/1965 | Wavak | |
| 3,233,704 A | * | 2/1966 | Strain et al. | |
| 3,754,624 A | * | 8/1973 | Eldred | 188/71.5 |
| 3,837,420 A | | 9/1974 | Kobelt | |
| 3,844,385 A | | 10/1974 | Szekely | |
| 3,915,272 A | | 10/1975 | Maurice | |

(List continued on next page.)

FOREIGN PATENT DOCUMENTS

| | | |
|---|---|---|
| DE | 2039003 A | 2/1971 |
| DE | 7012103 * | 7/1973 |
| DE | 3740373 | 6/1988 |
| DE | 019505112 A1 * | 8/1996 |
| DE | 019726674 A1 * | 1/1998 |
| EP | 0096553 | 12/1983 |
| EP | 000726406 A1 * | 8/1996 |
| EP | 001217248 A1 * | 6/2002 |
| GB | 0662071 | 11/1951 |
| GB | 0949018 | 7/1962 |
| GB | 1139699 | 9/1966 |
| GB | 1091693 | 11/1967 |
| GB | 1350350 | 4/1974 |

(List continued on next page.)

Primary Examiner—Douglas C. Butler
(74) Attorney, Agent, or Firm—Howard & Howard

(57) ABSTRACT

A disc brake system (10) comprises a disc (12,14), and a hub (16) which is arranged to rotate about an axis (18) thereof. The system (10) also comprises a mounting arrangement (20,22) by which the disc (12,14) is mounted on the hub (16) so that the hub and the disc rotate as a unit about the axis (18) and the disc can perform axial sliding movement on said hub. The mounting arrangement comprises a plurality of axially-extending grooves (20) formed in the hub (16) and teeth (22) projecting from the disc (12,14) into the grooves. The system (10) also comprises springs (32,42) located in at least some of the grooves (20) and engaging the teeth (22) acting to apply radial force between the disc (12,14) and the hub (16).

14 Claims, 4 Drawing Sheets

U.S. PATENT DOCUMENTS

| | | | |
|---|---|---|---|
| 4,026,393 A | * 5/1977 | Gebhardt et al. | 188/218 XL |
| 4,256,209 A | 3/1981 | Lupertz | |
| 4,479,569 A | * 10/1984 | Kummer et al. | 192/70.2 |
| 4,534,457 A | 8/1985 | Eltze et al. | |
| 4,576,255 A | * 3/1986 | Méry et al. | 188/71.5 |
| 4,673,065 A | 6/1987 | Gerard et al. | |
| 4,699,254 A | 10/1987 | Mery | |
| 4,844,206 A | * 7/1989 | Casey | 188/18 A |
| 4,863,000 A | 9/1989 | Patel | |
| 4,865,160 A | 9/1989 | Casey | |
| 5,005,676 A | 4/1991 | Gassiat | |
| 5,358,079 A | 10/1994 | Brown | |
| 5,402,865 A | 4/1995 | Harker | |
| 5,437,351 A | * 8/1995 | Lindner | 188/18 A |
| 5,674,026 A | 10/1997 | Ishibashi et al. | |
| 6,056,089 A | 5/2000 | Karlsson et al. | |
| 6,131,932 A | 10/2000 | Bunker | |
| 6,223,863 B1 | 5/2001 | Bunker | |
| 6,244,391 B1 | 6/2001 | Bunker | |
| 6,247,560 B1 | * 6/2001 | Bunker | 188/18 A |
| 6,298,953 B1 | 10/2001 | Bunker | |
| 6,305,510 B1 | * 10/2001 | Bunker | 188/73.38 |
| 6,467,588 B1 | * 10/2002 | Baumgartner et al. | 188/218 XL |
| 6,484,852 B1 | 11/2002 | Bunker | |
| 6,520,296 B1 | 2/2003 | Bunker | |
| 2002/0066625 A1 | * 6/2002 | Thorpe et al. | 188/73.38 |

FOREIGN PATENT DOCUMENTS

| | | | |
|---|---|---|---|
| GB | 1396503 | | 6/1975 |
| GB | 1530461 | | 11/1978 |
| GB | 2031538 | | 4/1980 |
| GB | 2150263 | A | 6/1985 |
| GB | 2164712 | | 3/1986 |
| GB | 2184801 | A | 7/1987 |
| GB | 2319921 | * | 6/1998 |
| GB | 2320299 | | 6/1998 |
| GB | 2320300 | | 6/1998 |
| GB | 2320301 | | 6/1998 |
| GB | 2340561 | | 2/2000 |
| GB | 2340562 | | 2/2000 |
| GB | 2340563 | | 2/2000 |
| GB | 2340564 | | 2/2000 |
| GB | 2346940 | | 8/2000 |
| GB | 2361973 | | 11/2001 |
| WO | 8905924 | | 6/1989 |
| WO | 9720150 | | 6/1997 |
| WO | 9825804 | | 6/1998 |
| WO | 9826191 | | 6/1998 |
| WO | 9826192 | | 6/1998 |
| WO | 0009900 | | 2/2000 |
| WO | 0009904 | | 2/2000 |
| WO | 0009905 | | 2/2000 |
| WO | 0009909 | | 2/2000 |
| WO | 0009911 | | 2/2000 |
| WO | 0042332 | | 7/2000 |
| WO | 0103295 | | 1/2001 |
| WO | 0133096 | | 5/2001 |
| WO | 0140671 | | 6/2001 |
| WO | 0186165 | | 11/2001 |
| WO | 0186167 | | 11/2001 |

* cited by examiner

MULTIPLE DISC BRAKE SYSTEM

This application is a 371 of PCT/GB99/02415 filed Jul. 26, 1999.

This invention is concerned with a disc brake system, for example for a wheel of a vehicle.

A conventional disc brake system comprises a hub mounted on a suspension link for rotation relative thereto, the hub providing a mounting for a wheel, and a disc brake comprising a disc mounted for rotation as a unit with the hub, friction material pads arranged on opposite sides of the disc, and at least one piston and cylinder assembly operable to urge the pads into engagement with the disc, to brake the hub and hence the wheel. Conventionally, the piston and cylinder assembly is slidably mounted on a slide bolted to the suspension link of the vehicle. The disc is conventionally rigidly fixed to the hub, and wear of the pads and/or the disc is accommodated by the sliding movement of the cylinder.

Disc brake systems are known in which the disc rotates with the hub as a unit but can perform sliding movement on the hub. For example, see GB 1 396 503 and WO 98/25804. However, since the discs are relatively thin, they tend to tilt on the hub and affect the braking ability. Also, there is a tendency for noise to be produced by rattle of the disc against the hub. At higher disc temperatures, these problems can be particularly severe since, when there is a large temperature differential, such as 600° C., between the braking surface of the disc and the hub, the disc expands considerably, away from the hub, exacerbating the problems of tilting and rattle. These problems are addressed in WO 98/26192 in which the solution proposed is to provide a plurality of resilient force applicators which are mounted between the hub and the disc, the force applicators acting to apply radially-directed forces to the disc to control the movement thereof, the force applicators being distributed circumferentially around the hub. In the example given in WO 98/26192, the disc take system comprises two discs mounted on the same hub. One mounting means for the disc on the hub disclosed, in WO 98/26192 comprises groups of axially-extending grooves formed in the hub and teeth projecting from the discs into said grooves, the teeth being slidable along the grooves. The force applicators are in the form of leaf springs mounted on the hub in the spaces between the groups of grooves. This system requires that, at least between the groups of grooves, there is sufficient clearance between the hub and the discs to accommodate the leaf springs and flexing thereof. This clearance has the disadvantage that it increases the possibility that a disc may tilt relative to the hub, thereby adversely affecting the operation of the brake.

It is an object of the present invention to provide a disc brake system in which the afore-mentioned disadvantage is overcome or at least reduced.

The invention provides a disc brake system comprising a disc, and a hub which is arranged to rotate about an axis thereof, the system also comprising mounting means by which the disc is mounted on the hub so that the hub and the disc rotate as a unit about said axis and the disc can perform axial sliding movement on said hub, said mounting means comprising a plurality of axially-extending grooves formed in the hub and teeth projecting from the disc into said grooves, each tooth being a sliding fit in one of said grooves, the system also comprising resilient means acting to apply radial force between the disc and the hub, characterised in that said resilient means is provided by springs located in at least some of said grooves and engaging the teeth of the disc which project into those grooves to apply radial force to said teeth.

In a disc brake system according to the invention, the springs are accommodated in the grooves in the hub so that space for them does not have to be provided between the grooves enabling the clearance to be reduced substantially. This enables the possibility of the disc tilting on the hub to be reduced.

A disc brake system according to the invention may be as disclosed in WO 98/25804, except that the splined mounting means by which discs are mounted on a hub is replaced by mounting means as disclosed herein. The brake system of WO 98/25804 comprises one or more discs which are slidable on a hub under the control of leaf springs which act between the hub and the discs. The system also comprises a cylinder which is integrally formed with a suspension link and a caliper also fixed to the suspension link, the caliper having supports for friction material pads mounted thereon.

In a disc brake system according to the invention, the springs may be flat leaf springs as disclosed in WO 98/26192 or any other suitable type of spring. For example, the springs may be leaf springs each of which comprises at least three abutments which project transversely of the spring and engage the disc so that the abutments apply force to the disc. This arrangement has the advantage that the number of points of contact between the spring and the disc is increased thereby spreading the forces more evenly around the disc. The abutments may be provided by embossed portions of the spring. The abutments, preferably, are elongated so that each abutment remains in engagement with the disc throughout said movement of the disc on the hub. For example, said abutments may be in the form of ridges extending parallel to the axis about which the hub rotates. The leaf springs may be secured to the outer surface of the hub in a manner such that the springs extend tangentially on the hub when the disc is not mounted on the hub. Cut-outs, the holes, may be formed in the leaf springs to control the force applied by the abutments to the disc. Where the disc brake system comprises one or more further discs mounted on the hub, the leaf springs may be arranged in groups, the spring in each group being associated with each disc, at least one spring in each group being retained in position by a connection to another spring in said group.

There now follows a detailed description, to be read with reference to the accompanying drawings, of a disc brake system which is illustrative of the invention.

Figure 1:
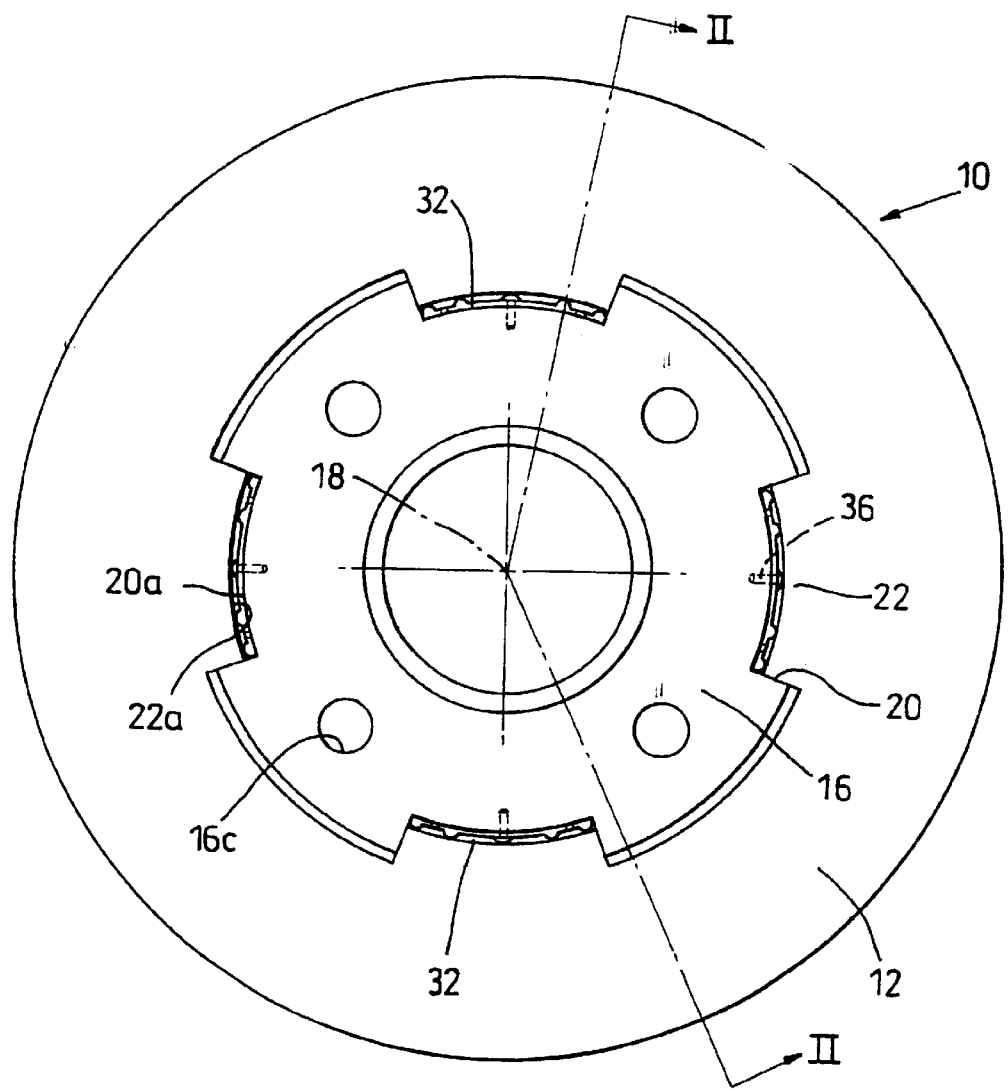
FIG. 1 is an end view of the illustrative disc brake system.
Figure 2:
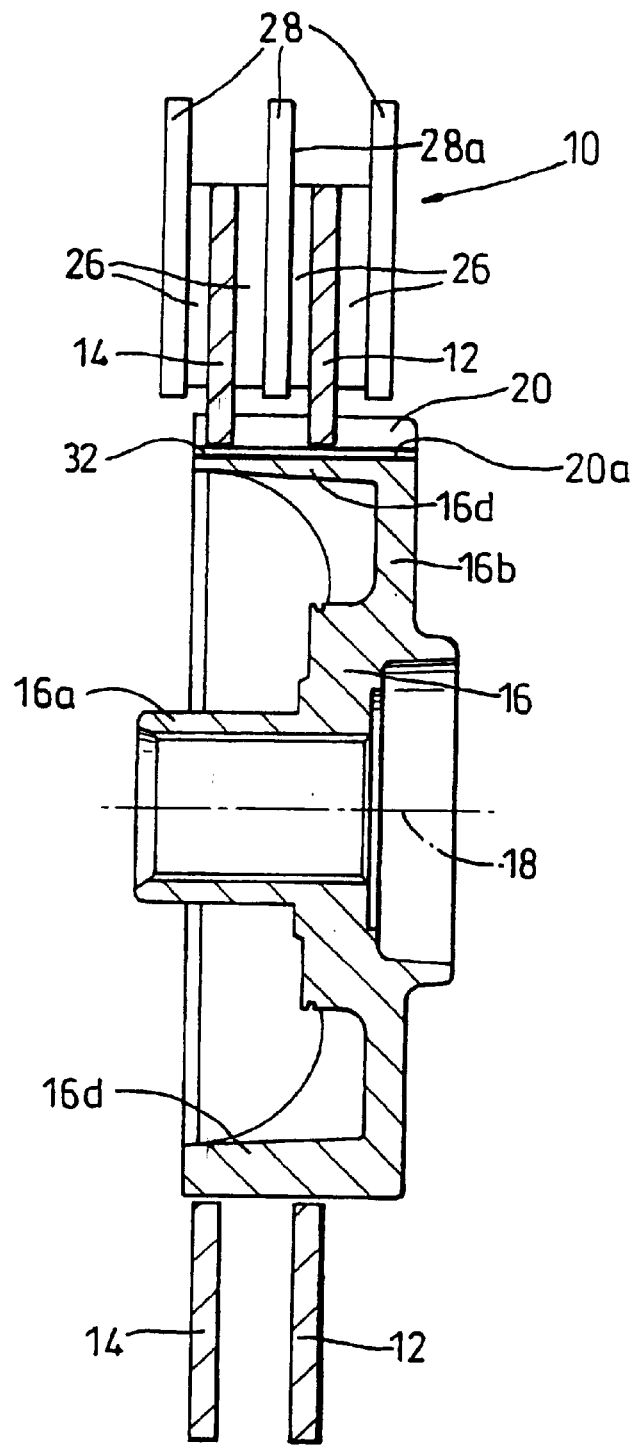
FIG. 2 is a cross-sectional view, on a larger scale, taken on the broken line II—II in FIG. 1.

The illustrative disc brake system 10 shown in FIGS. 1 and 2 is for a wheel (not shown) of a car. The system 10 comprises a disc 12, a further disc 14 and a hub 15, on which the wheel can be mounted. The hub 16 is arranged to rotate about a central axis 18 thereof.

The hub 16 comprises an internally splined hollow inner cylindrical portion 16a which is arranged to receive a drive shaft (not shown) which drives the wheel. The hub 16 also compriser an external flange 16b at the end of the portion 16a. This flange 16b has four bolt holes 16c through which the wheel can be bolted to the flange 16b in a conventional manner. The flange 16b also serves to connect the portion 16a to an outer hollow cylindrical portion 16d of the hub 16.

The discs 12 and 14 are identical to one another, being in the form of generally-annular cast iron or steel plates. The two discs 12 and 14 are mounted by means of mounting means of the system 10 on the cylindrical outer surface of the hub portion 16d so that the hub 16 and the two discs 12 and 14 rotate as a unit about the axis 18 and the discs 12 and 14 can perform axial sliding movement on said hub 16. The mounting means comprises four grooves 20 which are formed in the outer cylindrical surface of the portion 16d of the hub 16 and four teeth 22 which project inwardly from each of the discs 12 and 14. The teeth 22 enter the grooves 20 and are a sliding fit therein. However, the teeth 22 do not extend to the bottom surfaces 20a of the grooves 20, there being a clearance between the bottom surfaces 20a and the inner surfaces 22a of the teeth 22. The grooves 20 are equally-spaced circumferentially about the axis 18 and each occupies an arc of approximately 45° about the axis 18. Between the grooves 20, the outer surface of the hub portion 16d is machined to be accurately cylindrical about the axis 18. The inner surface of each disc 12 and 14, between the teeth 22, is also machined to be accurately cylindrical about the axis 18 and a close fit over the cylindrical portions of the outer surface of the hub portion 16d. The close fit of the discs 12 and 14 on the hub 16 reduces the possibility of the discs 12 and 14 tipping.

The system 10 also comprises four friction pads 26 (FIG. 2) for braking the discs 12 and 14 by engaging side surfaces of the discs. The friction material pads 26 are secured to three backing plates 28, one backing plate 28a being between the discs 12 and 14 and the others being on opposite sides of the discs 12 and 14 to the plate 28a. The median plate 28a has friction pads 26 secured to both of its faces. The brake pads 26 and the backing plates 28 are not shown in FIG. 1. The brake pads 26 are brought into braking contact with the discs 12 and 14 by operating means (not shown) which may be similar to that described in WO 98/25804. When the brakes are applied, a movable outer friction material pad 26 is moved until the four pads 26 and the discs 12 and 14 are all in contact with one another, the discs 12 and 14 and the plate 28a sliding axially to accommodate this movement.

The system 10 also comprises resilient means acting to apply radial force between the discs, 12 and 14, and the hub 16. The resilient means comprises four leaf springs 32 mounted on the hub 16 and engaging the discs 12 and 14 so that the springs 32 apply radial force between each of the discs 12 and 14 and the hub 16. The leaf springs 32 are equally distributed circumferentially around the hub 16, each being mounted on one of the bottom surfaces 20a of the grooves 20, ie the springs 32 are located in the grooves and act between the surface 20a and the inner surface 22a of the tooth 22 which enters the groove 20.

Figure 3:
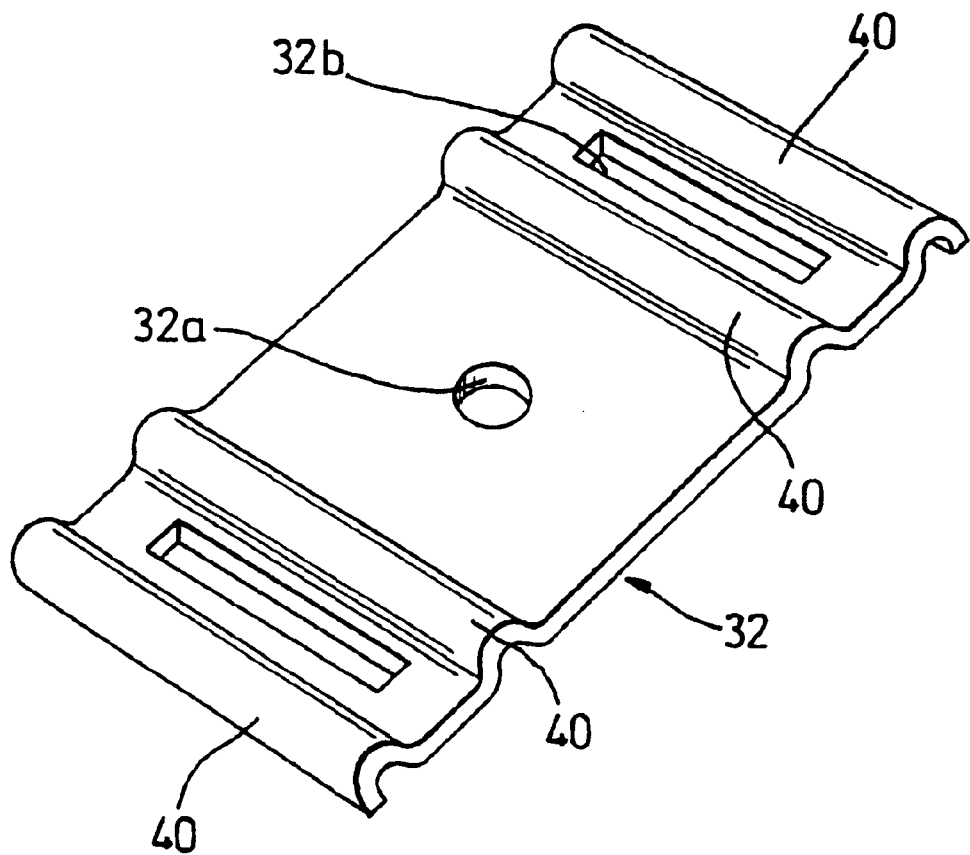
FIG. 3 is a perspective view, on a greatly enlarged scale, of a leaf spring of the illustrative disc brake system.

One of the leaf springs 32 is shown in detail in FIG. 3. Each spring 32 is formed from a generally rectangular piece of spring steel which is 0.25–0.3 mm thick. Each spring 32 is secured in the circumferential centre of one of the surfaces 20a by means of a central screw 36 which passes through a hole 32a in the spring 32 and enters the hub 16. Each spring 32 extends axially on the hub 16 throughout the range of axial movement of both discs 12 and 14 so that both discs 12 and 14 are engaged by all four of the springs 32 continuously. The springs 32 act to control the sliding movement of the discs 12 and 14 on the hub 16 preventing tipping of the discs and compensating for thermal expansion effects.

Each spring 32 comprises four axially-extending abutments 40 which project transversely of the spring 32. The abutments 40 are arranged with two of the abutments on each side of the hole 32a. Two of the abutments 40 are formed at the extreme ends of the spring 32, thereby preventing the edge of the spring 32 from engaging the tooth 22 and reducing the risk of cracking of the spring 32. Between the two abutments 40 on each side of the hole 32a, a rectangular hole 32b is cut out of the spring 32. The hole 32b serves to control the force applied by the abutments 40 to the discs 12 and 14.

The abutments 40 are provided by embossed portions of the spring 32 which are in the form of generally semi-circular (in transverse cross-section) ridges extending parallel to the axis 18. The abutments 40 are elongated in the axial direction so that each abutment 40 remains in engagement with both or the discs 12 and 14 throughout the movement of the discs 12 and 14 on the hub 16.

Each spring 32 is arranged to engage the discs 12 and 14 with its abutments 40 and apply force to the discs to control the movement thereof on the hub 16. Each spring 32 is arranged so that the spring 32 extends generally tangentially of the hub 16 when the discs 12 and 14 are not mounted on the hub 16. However, the springs 32 are deformed by the presence of the discs 12 and 14 so that each abutment 40 presses resiliently on the discs 12 and 14. The springs 32, thus, act to apply radially-directed forces to the discs 12 and 14.

In the operation of the disc brake system 10, the springs 32 as aforementioned control the sliding movement of the discs 12 and 14 on the hub 16. Each spring 32 engages each disc at four points of contact, provided by the abutments 40, thereby distributing the force applied by the spring 32 to each disc more uniformly.

Figure 4:
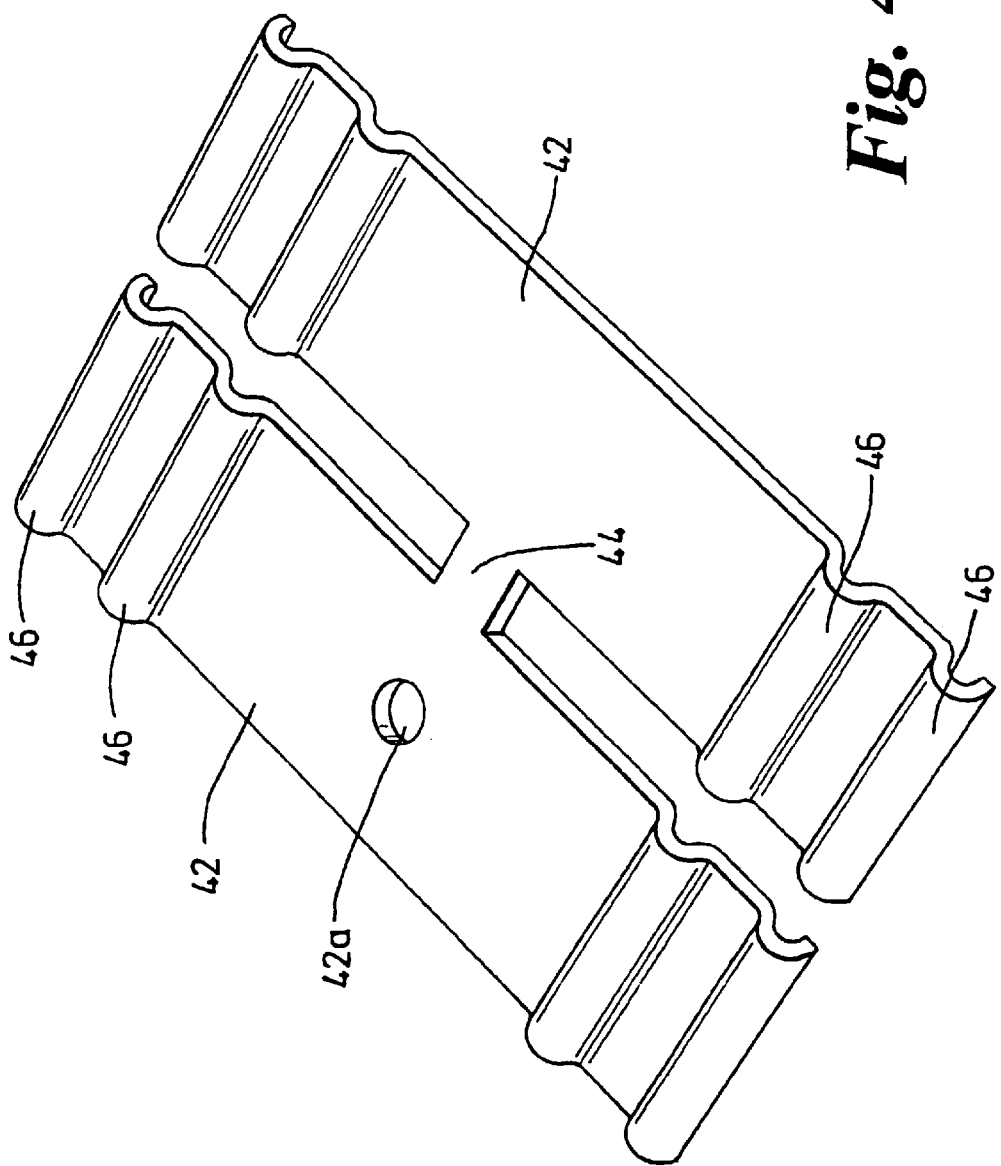
FIG. 4 is a view similar to FIG. 3 but of an alternative leaf spring of the illustrative disc brake system.

FIG. 4 shows two leaf springs 42 which are joined together by a narrow tab 44, the springs 42 and the tab 44 being formed from a single sheet of spring steel. The two leaf springs 42 each have a similar form to the spring 32 except that the holes 32b are omitted, each spring 42 having four abutments 46 which are similar to the abutments 40 of the spring 42. However, the springs 42 are narrower than the spring 32 because each spring 42 is intended to engage only one of the discs 12 and 14. The springs 42 are mounted on the surfaces 20a (as a unit connected by the tab 44) by means of a screw (not shown) which passes through a hole 42a formed in one of the springs 42. Thus, each of the discs 12 and 14 has four of the leaf springs 42 associated therewith, the springs 42 being arranged in groups of two, one of which is mounted on the hub 16 and the other of which is retained in position by the connection, via the tab 44, to the first-mentioned spring. As the tab 44 is narrow, the springs 42 act substantially independently.

In modifications of the springs 32 and 42, the holes 32a and 42a may be omitted and the springs provided instead with self-retaining means for retaining them on the hub 16. For example, such self-retaining means may comprise integral tabs extending from the spring over opposite ends of the hub 16 so that the springs can be clipped over the hub. In the case of the spring 32, such tabs extend normally to the general plane of the spring from both the edges of the spring which are perpendicular to the projections 40. In the case of the springs 42, each of the end springs 42 in a group has one of the these tabs extending from its opposite edge to the position of the tab 44.

In a further modification, the spring 32 and 42 can be formed into a non-planar form in order to determine the forces they will apply to the disc. For example, the springs can be formed into an arcuate shape such that, when the spring is mounted on the hub but before the discs are mounted on the hub, the ends of the spring are further from the hub than if the spring were planar.

What is claimed is:

1. A disc brake system comprising a hub which is arranged to rotate about an axis thereof, a disc disposed about said hub and extending radially from said hub and said axis thereof, a plurality of axially-extending grooves formed in the hub and teeth projecting radially inwardly from the disc into said grooves, each tooth being a sliding fit in one of said grooves whereby said disc is axially slideable on said hub, and springs located in at least some of said grooves and engaging said teeth of the disc which project into those grooves and applying a radial outward force to said teeth.

2. A disc brake system according to claim 1, wherein said springs are leaf springs.

3. A disc brake system according to claim 2, wherein each of said leaf springs comprises a plurality of abutments arranged to engage the teeth and apply force thereto.

4. A disc brake system according to claim 3, wherein said abutments are provided by embossed portions of said leaf springs.

5. A disc brake system according to claim 3, wherein said abutments are elongated so that each abutment remains in engagement with the disc throughout said movement of the disc on the hub.

6. A disc brake system according to claim 3, wherein said abutments are in the form of ridges extending parallel to the axis about which the hub rotates.

7. A disc brake system according to claim 2, wherein the leaf springs are secured to the outer surface of the hub in a manner such that the springs extend tangentially of the hub when the disc is not mounted on the hub.

8. A disc brake system according to claim 3, wherein cut-outs are formed in the leaf springs to control the force applied by the abutments to the disc.

9. A disc brake system according to claim 2, wherein the leaf springs are provided with self-retaining means for retaining them on the hub.

10. A disc brake system according to claim 1, wherein said grooves have a bottom surface and said teeth have an inner surface spaced from said bottom surface of said grooves.

11. A disc brake system according to claim 1 wherein said grooves are equally spaced circumferentially about said hub, with each groove extending through an arc of about 45°.

12. A disc brake system according to claim 1 wherein said hub includes an outer cylindrical portion extending between adjacent pairs of said grooves, and said disc includes in inner cylindrical portion extending between adjacent pairs of teeth slideably guided by said outer cylindrical portion of said hub to restrict tipping of said disc on said hub.

13. A disc brake system, comprising:

a hub rotatable about an axis of said hub and formed with a plurality of axially extending grooves;

a disc disposed about said hub and extending radially from said hub and having a plurality of teeth extending radially inwardly into said grooves of said hub and supporting said disc for axial sliding movement on said hub while supporting said disc against relative rotational movement on said hub; and a spring disposed in at least one of said grooves and acting on said disc to apply a radial outward force on at least one of said teeth of said disc associated with said at least one of said grooves.

14. A disc brake system comprising a hub which is arranged to rotate about an axis thereof, a disc disposed about said hub and extending radially from said hub and said axis thereof, a plurality of axially-extending grooves formed in the hub and teeth projecting radially inwardly from the disc into said grooves, each tooth being a sliding fit in one of said grooves whereby said disc is axially slideable on said hub, and leaf springs located in at least some of said grooves and engaging said teeth of the disc which project into those grooves and applying a radial outward force to said teeth, each of said leaf springs including a plurality of parallel ridges extending axially for remaining in engagement with the disc as said disc moves on said hub.

* * * * *